United States Patent [19]

Brieseck et al.

[11] Patent Number: 4,660,786
[45] Date of Patent: Apr. 28, 1987

[54] PIVOT BEARING ARRANGEMENT FOR THE CONTROL SURFACE OF A MISSILE

[75] Inventors: Bernd Brieseck, Henfenfeld; Josef Nagler, Rothenbach, both of Fed. Rep. of Germany

[73] Assignee: Diehl GmbH & Co., Nuremberg, Fed. Rep. of Germany

[21] Appl. No.: 792,459

[22] Filed: Oct. 29, 1985

[30] Foreign Application Priority Data

Nov. 14, 1984 [DE]  Fed. Rep. of Germany ....... 3441534

[51] Int. Cl.⁴ .............. F42B 13/32; F42B 15/053; F42B 15/027; F16J 15/16
[52] U.S. Cl. ............................ 244/324; 244/3.29; 277/27
[58] Field of Search ............... 244/3.21–3.29; 384/489; 277/27, 12, 32, 177; 403/362, 58, 74

[56] References Cited

U.S. PATENT DOCUMENTS

| | | | |
|---|---|---|---|
| 3,024,027 | 3/1962 | Kubiak | 277/27 |
| 3,037,826 | 6/1962 | Zeller | 384/489 |
| 3,135,203 | 6/1964 | Halsted et al. | 244/3.24 |
| 3,650,496 | 3/1972 | Svensson | 244/3.29 |
| 3,743,333 | 7/1973 | Kosinski | 403/362 |
| 3,843,075 | 10/1974 | Webster et al. | 244/3.21 |

Primary Examiner—Deborah L. Kyle
Assistant Examiner—Michael J. Carone
Attorney, Agent, or Firm—Scully, Scott, Murphy & Presser

[57] ABSTRACT

A pivot or bearing arrangement for the pivotable control surface of a guidable missile, especially a projectile which can be fired through the intermediary of the gas pressure generated by a propellant charge. The pivot bearing includes a control surface support guided by a radial ball bearing, including a circular shoulder which axially contacts against a sealing ring which lies on a shoulder of the supportive tail end structure of the projectile and which is constituted of a resiliently deformable or compressible material.

5 Claims, 1 Drawing Figure

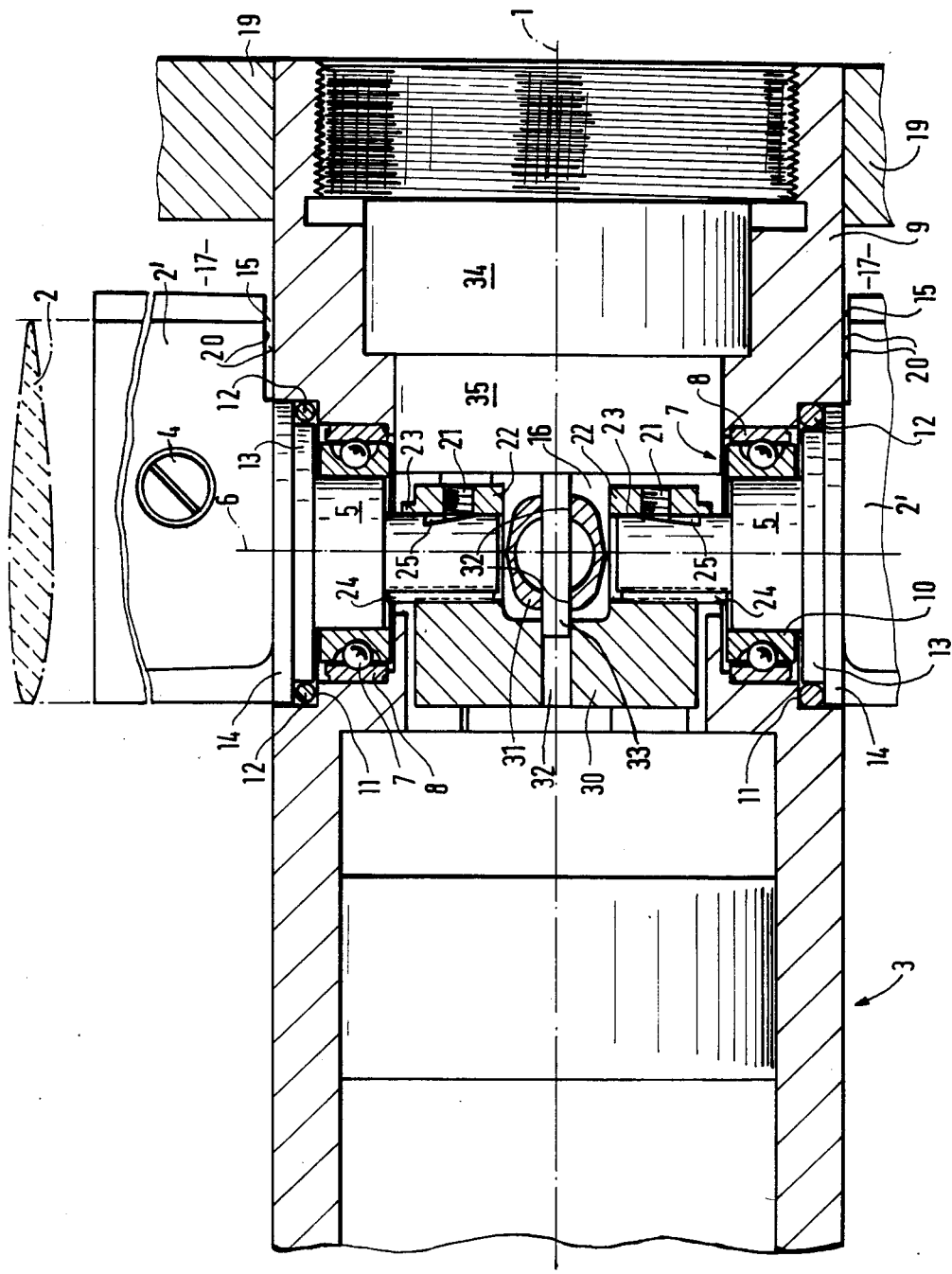

PIVOT BEARING ARRANGEMENT FOR THE CONTROL SURFACE OF A MISSILE

BACKGROUND OF THE INVENTION

1. Field of the Invention

The present invention relates to a pivot or bearing arrangement for the pivotable control surface of a guidable missile, especially a projectile which can be fired through the intermediary of the gas pressure generated by a propellant charge.

2. Discussion of the Prior Art

A pivot bearing arrangement of the type under consideration has become known from the disclosure of German Patent No. 24 10 255. In that instance, provision is made to so arrange the control surfaces of an oversized-caliber four-bladed control surface system on a missile, as to enable it to be conducted from a position in which it is folded in parallel with the longitudinal axis of the missile, into a spread-apart or extended operative position; whereby in this operative position, there is facilitated a positioning of the applicable pair of mutually diametrically oppositely located control surfaces inclined relative to the longitudinal axis of the missile, in that a retaining ring which encompasses the missile is tilted about a diagonal axis by means of a linear control system, which axis represents the pivot axis for the positioning of the control surfaces.

Disadvantageous in th is prior art control surface pivot bearing arrangement is not only the need for the large amount of space for the setting ring which encompasses the missile, and which is fastened to the control surfaces secured against rotation relative thereto; but especially also in that no measures of any kind are provided for the sealing of the pivot support in the structure of the missile, which would facilitate the firing of the latter from a weapon barrel; for example, by means of propellant gases or compressed air. Such an instance of utilization is given when, for example, a projectile which is guidable during its final flight phase, for instance, a mortar grenade, is to be fired from a weapon barrel through the intermediary of a propellant charge. In order not to adversely influence the functions of the setting and control arrangement, there must be ensured under all circumstances, that upon the firing of the projectile from the dammed weapon barrel, the hot propellant gases which stand under a high pressure cannot penetrate through the bearing locations for the control surface into the interior of the projectile tail end structure with its setting components for the control surfaces. On the other hand, the sealing measures which are taken against the high pressures of the hot propellant gases may not lead to the point at which there must be readily afforded unacceptably high drive energies for the setting system, in order to be able to overcome the friction forces encountered due to the sealing action during the pivotal movement of the control surfaces.

SUMMARY OF THE INVENTION

Accordingly, in recognition of these conditions, it is an object of the present invention to so improve upon a pivot bearing arrangement of this type which, on the one hand, at extremely small built-in dimensions, achieves a gastight sealing of the interior of the projectile with regard to the external propellant charge pressure, but which, on the other hand, requires only low positioning forces due to the easily effected pivoting displacement of the control surfaces.

The foregoing object is essentially achieved in an arrangement of the above-mentioned type in which the inventive pivot bearing includes a control surface support guided by a radial ball bearing, which by means of a circular shoulder axially contacts against a sealing ring which lies on a shoulder of the supportive tail end structure of the projectile and which is constituted of a resiliently deformable or compressible material.

In accordance with the foregoing, the pressure rise which, for example, is caused by the burning down of the propellant powder outside of the supportive projectile tail end structure for the pivot support of the control surface leads to an axial displacement and, as a result, to the enhanced axial sealing action of a sealing ring, which concurrently fulfills return or restoring functions (in the axial operating position after the reduction of the external pressure).

Hereby, it is expedient to provide an axial positionally-dependent close-fitted and/or a load-transmissive connection between the axle of the control surface and a coupling element to the setting system thereof; whose load-transmissive engagement is only provided in the operative axial position of the control surface axle; in essence, will not influence the axial compression for increasing the sealing function of the sealing ring.

BRIEF DESCRIPTION OF THE DRAWINGS

Additional alternatives and modifications, as well as other features and advantages of the invention can now be readily ascertained from the following detailed description, taken in conjunction with the accompanying single FIGURE of the drawing which, generally diagrammatically, illustrates in an axial longitudinal section through the pivoting axis for the positioning of the control surface, a construction of the inventive pivot bearing arrangement in its operational position.

DETAILED DESCRIPTION

The control surface or airfoil 2 which is fastened to its control surface pivot support 2' is shown in its operative position; essentially, in every instance subsequent to firing of the projectile from the weapon barrel, has the airfoil chord oriented in parallel with the longitudinal axis 1 of the projectile, and serves for the aerodynamic directional control of its projectile 3. The control surface is fastened by means of a screw 4 to a stepped rotatably-supported support 5 so as to be secured against rotation relative thereto, whose axis of rotation 6, transversely of the longitudinal axis 1 of the projectile extends through a ball groove bearing constituting a radial ball bearing 7. The outer race 8 of the bearing is retained in the supportive tail end structure 9 of the projectile 3, whereas the inner race 10 possesses a permissible amount of radial play with respect to the support 5, which ensures the axial movement of the support 5 under pressure loads.

A shoulder 11 is worked into the tail end structure 9 coaxially with the axis of rotation 6, for each control surface 2, into which there is inserted an elastic sealing ring 12 (O-ring) radially externally of the bearing 7 relative to the longitudinal axis 1 of the projectile, and which encompasses the axis 6 of the bearing. A short axial projection 13 on the support 5 which project radially beyond the inner race 10 of the ball bearing, engages radially into the inside of the sealing ring 12, against which there axially contact a radially further outwardly projecting circular shoulder 14 on the support 5. The contour of the support 5, in connection with the complementary contour of the tail end structure 9 and the outer race 8 of the ball bearing, evidences a small amount of axial play 15, such that the sealing ring 12 can be axially deformed or compressed for enhancing its sealing action, when the support 5 is impartial to an axial displacement in a direction towards the interior 16 of the projectile 3. This will occur, for example, when there is built up in the dammed-up chamber 17 of a firing barrel (not shown in the drawing), in essence, externally of the tail end structure 9, the gas pressure from an ignited propellant charge 19 for the acceleration of the projectile 3.

In order to avoid the axial displacement of the supports 5 caused by the propellant gas pressure from crushing the sealing ring 12, it can be expedient to provide bearing surfaces 20 at least at one location between the pivot support 2' and/or a part of its support 5, as well as the supportive tail end structure 9 (for limiting the axial displacement of the support 5; in effect, the axial play 15 of the pivot bearing for the control surface 2). Also at a mechanical arresting, there remains ensured the axial displacement of the control surface 2 inclusive the support 5 due to contact of these bearing surfaces 20 against each other, through the axial compression of the sealing ring 12 such that, for example, gases from the dammed-up chamber 17 cannot penetrate through the pivot bearing arrangement for the control surfaces into the interior 16 of the tail end structure 9 of the projectile.

For every shaft-like end of the support 5 which passes through its bearing 7 into the interior 16 of the tail end structure 9, the kinetic coupling between a setting element (not shown in the drawing) and the similarly acting pivot-support 2' for the control surface, is formed by, for example, a U-shaped coupling element 30; which relates in the instance of a linear setting or control element, to a pivot arm for the conversion of the linear movement into a rotational movement for the positioning of the control surface relative to the longitudinal axis 1 of the projectile. With respect to further details, reference is made to the present applicants concurrently filed patent application, entitled "Coupling Arrangement Between a Linear Control Element and a Pivotable Element, Especially a Control Surface", Ser. No. 792,458 the disclosure of which is incorporated herein by reference. Provided between the coupling element 30 and each support 5 is a force-transmissive axial adjustability by means of a threaded pin 21 which, in the illustrated exemplary instance, is screwed into the hub 22 of the coupling element transversely of the axis of rotation 6, and which is supported against the outer surface 23 of the portion of the support 5 passing through the bearing 7, in opposition to an adjusting spring 24.

In order that, because of the closed fit or linkage between the hub 22 of the coupling element hub 22 (held at a fixed distance from the longitudinal axis 1 of the projectile) and the support 5 which is axially displaceable under the influence of the propellant gas pressure, there is not hindered this axial displacement, the outer surface 23 is provided at its end surface area which is engaged by the threaded pin 21, with a ramp-like recess 25. The recess is sloped to such an extent relative to the displacement direction; in effect, relative to the axis of rotation 6, that at the axially deformed or compressed sealing ring 12 there is then present a small interspace or gap between the threaded pin 21 and the support 5 (as can be ascertained from the drawing). When, for example, subsequent to the firing of the projectile 3 from the weapon barrel, a gas pressure which has led to the axial displacement of the control surface 2 together with its support 5, has again disappeared, then the arrangement consisting of the control surface 2 and the support 5 is again moved back axially by the unstressing sealing ring 12 constituted of resilient material, in parallel with the longitudinal axis of the adjusting spring 24; until the ramp of the recess 25 again lies force-locked against the end surface of the threaded pin 21, and thus there is again achieved the axially adjusted position between the support 5 and the coupling element 30. In this manner there is ensured that there takes place an axial displacement, which is not excessively influenced by a force-locked connection, of the control surface 2 which is fastened through the pivot bearing 2' to its support 5, while ensuring the sealing action of the sealing ring 12 closely outside of the ball bearing 7, when the projectile 3, for example, by means of the propellant charge pressure which is built up externally of the tail end structure 9 within a weapon barrel, is fired from this barrel.

The inventive pivot bearing arrangement is of special advantage in that, through the threaded pin 21 and the ramp-shaped recess 25 presently associated therewith, facilitates a stable and good reproducible adjustment of the applying pressure through the sealing ring 12. Thus, through the depth of the threading in of the threaded pin 21 there can be ensured the sealing function during the build-up of a pressure in the dammed up chamber 17; whereby this sealing function at a sufficient pressure build-up through the deplacement of the support 5, in effect through the axial deformation of the sealing ring 12, is enhanced with a further rising surrounding pressure.

Furthermore, the inventive configuration of the pivot bearing arrangement opens the possibility of a simple assurance in providing the basic positioning of the pivot support 2' for the control surface during the firing of the projectile 3 from a barrel. Due to the arcuate extent of a coupling element 30 between oppositely facing supports 5, space remains in the interior of the tail end structure 9 for the radial through-passage of a coupling element 31 oriented transversely thereof, which serves for the positioning of further control surfaces (not shown) which are oriented transverse to the control surfaces 2. In neutral or basic position of the pivot supports 2' for the control surfaces, and thereby of the coupling elements 30, 31 in their supports 5, there is provided axial alignment of bores 32 extending through the coupling elements 30, 31. In this basic position which is assumed during firing, an arresting pin 33, in the illustrated construction extending in the longitudinal axis 1 of the projectile, can as a result engage through the bores 32 into the coupling elements 30 and so mechanically arrest these; in essence, the control surfaces 2, in the basic position. During the presence of the superatmospheric pressure in the dammed up chamber 17, the pivot supports 2' inclusive ramp-shaped recesses 25 are displaced towards the inside of the projectile 16, and as a result are mechanically uncoupled from any connection with the setting or control elements (through the pins 21 and the coupling elements 30, 31), such that the arresting pin 33 is then no longer loaded by the control surfaces 2. The arresting is eliminated in that, by means of a safety device 34, which is rearwardly threaded into the tail end structure 9, subsequent to the firing there is an activated, for example, a pyrotechnic power element 35 which draws the pin 33 back out of the bores 32. As a result, there are freed the rotational movements for the setting of the pairs of control surfaces 2 subsequent to leaving the firing tube or weapon barrel from the basic position, which is provided during the backward movement of the pivot support 2' through the threaded pins 21 (opposite the ramp-shaped recesses 25).

What is claimed is:

1. In a pivot bearing arrangement for pivotable control surfaces of a guidable missile, which is fireable through the intermediary of the gas pressure of a propellant charge; the improvement comprising: a cylindrical support for each said control surface extending into a tail end structure of said projectile, a radial ball bearing guiding said support in said tail end structure, a sealing ring constituted of a resiliently deformable material being axially contacted by a circular shoulder on said support, said sealing ring bearing against a shoulder in said tail end structure; an axially extending recess is formed in the cylindrical surface of the support said recess having a bottom surface inclined relative to of the longitudinal axis of said support so that said recess deepens in a radially outward direction; a coupling element for each said control surface support in said tail end structure; a threaded pin in said coupling element, said threaded pin engaging into said recess into contact with the bottom surface thereof at a location remote from the deepest point of the recess, said sealing ring being axially deformed upon radial displacement, relative to the longitudinal axis of the projectile, of the support for each said control surface in response to the gas pressure of said propellant charge.

2. A bearing arrangement as claimed in claim 1, comprising bearing surfaces on the tail end structure of said projectile, on said support and on a pivot support on each said control surface for limiting the axial displacement of the support for each said control surface relative to said sealing ring.

3. A bearing arrangement as claimed in claim 1, wherein the threaded pin is adjustably extendable into said recess and provides an axial prestressing of the shoulder against the sealing ring.

4. A bearing arrangement as claimed in claim 1, wherein the supports for the control surfaces have axes of rotation crossing each other within the tail end structure of the projectile; and said coupling elements each include bores for effecting a rigid connection between oppositely located control surface supports and control elements for positioning said supports in the operative positions thereof, said bores being in alignment in said operative positions; and an arresting pin extending through said bores for latching said coupling elements.

5. A bearing arrangement as claimed in claim 4, wherein the arresting pin is displaceable from said bores by a power element actuated by a safety device for release from the arresting position in the coupling elements.

* * * * *